(12) United States Patent
Suh et al.

(10) Patent No.: US 7,942,656 B2
(45) Date of Patent: May 17, 2011

(54) COMPRESSOR AND DEVICE FOR REDUCING VIBRATION THEREFOR

(75) Inventors: Jeong-Hwan Suh, Seoul (KR); Nam-Soo Lee, Seoul (KR); Seung-Yup Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 12/045,143

(22) Filed: Mar. 10, 2008

(65) Prior Publication Data
US 2008/0292484 A1 Nov. 27, 2008

(30) Foreign Application Priority Data

Mar. 21, 2007 (KR) .................. 10-2007-0027821

(51) Int. Cl.
*F01C 21/00* (2006.01)
(52) U.S. Cl. ........................................ 418/151
(58) Field of Classification Search .................... 418/151
See application file for complete search history.

(56) References Cited

U.S. PATENT DOCUMENTS

| | | | |
|---|---|---|---|
| 3,922,114 A | 11/1975 | Hamilton et al. | 417/366 |
| 4,343,599 A | 8/1982 | Kousokabe | 418/55.6 |
| 4,755,114 A | 7/1988 | Shibayashi et al. | 418/55.6 |
| 4,889,471 A | 12/1989 | Izunaga et al. | 418/55.6 |
| 4,898,520 A * | 2/1990 | Nieter et al. | 418/151 |
| 5,174,740 A | 12/1992 | Jang | 418/55.6 |
| 5,219,281 A | 6/1993 | Caillat et al. | 418/55.6 |
| 5,263,822 A | 11/1993 | Fujio | 418/55.6 |
| 5,310,326 A | 5/1994 | Gui et al. | 418/76 |
| 5,370,513 A | 12/1994 | Fain | 418/99 |
| 5,591,018 A | 1/1997 | Takeuchi et al. | 417/366 |
| 5,772,411 A | 6/1998 | Crum et al. | 418/55.1 |
| 5,775,120 A | 7/1998 | Inazuka et al. | 62/259 |
| 5,775,123 A | 7/1998 | Wakayama et al. | 62/407 |
| 5,947,373 A | 9/1999 | Saito et al. | 237/2 |
| 6,042,346 A | 3/2000 | Doi | 417/371 |
| 6,106,254 A | 8/2000 | Hirooka et al. | 418/55.6 |
| 6,123,527 A * | 9/2000 | Kawada et al. | 418/151 |
| 6,149,413 A | 11/2000 | Lifson | 418/99 |
| 6,182,460 B1 | 2/2001 | Hernandez | 62/262 |
| 6,309,198 B1 | 10/2001 | Zamudio et al. | 418/55.6 |
| 6,374,492 B1 | 4/2002 | Myung et al. | 28/890.3 |
| 6,386,840 B1 | 5/2002 | Williams et al. | 418/55.6 |
| 6,412,298 B2 | 7/2002 | Kang et al. | 62/262 |
| 6,422,843 B1 | 7/2002 | Sun et al. | 418/99 |
| 6,527,085 B1 | 3/2003 | Paczuski | 184/6.18 |
| 6,554,595 B2 | 4/2003 | Hida et al. | 418/DIG. 1 |
| 6,588,228 B2 | 7/2003 | Choi | 62/426 |
| 6,599,100 B2 | 7/2003 | Abe et al. | 418/55.6 |
| 6,746,215 B2 | 6/2004 | Tani et al. | 418/55.6 |
| 6,772,601 B1 | 8/2004 | Davis et al. | 62/187 |

(Continued)

FOREIGN PATENT DOCUMENTS

JP          62-135693          6/1987

(Continued)

*Primary Examiner* — Thomas E Denion
*Assistant Examiner* — Mary A Davis
(74) *Attorney, Agent, or Firm* — Ked & Associates LLP

(57) ABSTRACT

A compressor and device for reducing vibration therefor is provided herein. The compressor includes a compression device having a compression chamber, and configured to receive, compress, and output a refrigerant, a drive motor configured to rotate the compression device to compress a refrigerant within the compression chamber, and a torsional vibration absorbing device attached to the motor and configured to absorb torsional vibration.

24 Claims, 8 Drawing Sheets

U.S. PATENT DOCUMENTS

| | | | |
|---|---|---|---|
| 6,860,729 B2 * | 3/2005 | Sowa et al. | 418/151 |
| 6,868,681 B2 | 3/2005 | Woo et al. | 62/175 |
| 6,925,832 B2 | 8/2005 | Kitaura et al. | 418/55.1 |
| 6,932,586 B2 | 8/2005 | Furusho et al. | 418/55.6 |
| 6,951,628 B2 | 10/2005 | Edam et al. | 264/401 |
| 6,955,064 B2 | 10/2005 | Lee et al. | 62/453 |
| 6,962,058 B2 | 11/2005 | Kim et al. | 62/175 |
| 7,032,404 B2 | 4/2006 | Kim et al. | 62/262 |
| 7,036,331 B2 | 5/2006 | Kim | 62/62 |
| 7,055,338 B2 | 6/2006 | Ergarac et al. | 62/228.1 |
| 7,082,776 B2 | 8/2006 | Shin | 62/186 |
| 7,112,046 B2 | 9/2006 | Kammhoff et al. | 418/55.1 |
| 7,114,345 B2 | 10/2006 | Kim et al. | 62/296 |
| 7,121,106 B2 | 10/2006 | Jung et al. | 62/324.6 |
| 7,311,501 B2 | 12/2007 | Wehrenberg et al. | 418/55.6 |
| 7,384,250 B2 | 6/2008 | Shin et al. | 418/55.6 |
| 2003/0063986 A1 | 4/2003 | Ginies et al. | 417/366 |
| 2005/0232800 A1 | 10/2005 | Kammhoff et al. | 418/55.6 |
| 2005/0265878 A1 | 12/2005 | Ishida | 418/55.1 |
| 2006/0057012 A1 | 3/2006 | Park et al. | 418/55.6 |
| 2006/0065012 A1 | 3/2006 | Kudo | 62/469 |
| 2006/0171831 A1 | 8/2006 | Elson et al. | 418/55.6 |
| 2006/0216182 A1 | 9/2006 | Kohsokabe et al. | 418/55.6 |
| 2007/0071627 A1 | 3/2007 | Lee et al. | 418/55.6 |

FOREIGN PATENT DOCUMENTS

| | | |
|---|---|---|
| JP | 62298679 A * | 12/1987 |
| JP | 63-192985 | 8/1988 |
| JP | 02-146285 | 6/1990 |
| JP | 03-160178 | 7/1991 |
| JP | 05-149274 | 6/1993 |
| JP | 06-002680 | 1/1994 |
| JP | 06-100186 | 4/1994 |
| JP | 06-235387 | 8/1994 |
| JP | 07-054788 | 2/1995 |
| JP | 07-197893 | 8/1995 |
| JP | 07-332265 | 12/1995 |
| JP | 08-151990 | 6/1996 |
| JP | 2001-207980 | 8/2001 |
| JP | 2001-329978 | 11/2001 |
| JP | 2002-138961 | 5/2002 |
| JP | 2003-003974 | 1/2003 |
| JP | 2003-293955 | 10/2003 |
| JP | 2004-100662 | 4/2004 |
| JP | 2005-201145 | 7/2005 |
| KR | 10-2000-0026721 | 5/2000 |
| KR | 10-2001-035692 | 5/2001 |
| KR | 10-2001-0057497 | 7/2001 |
| KR | 10-2001-0059281 | 7/2001 |
| KR | 10-2005-0062998 | 6/2005 |
| KR | 10-2005-0073532 | 7/2005 |

* cited by examiner

COMPRESSOR AND DEVICE FOR REDUCING VIBRATION THEREFOR

The application claims priority to Korean Application No. 10-2007-0027821 filed in Korea on May 21, 2007, which is herein incorporated by reference in its entirety.

BACKGROUND

1. Field

A compressor and a device for reducing vibration therefor are disclosed herein.

2. Background

Compressors are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Figure 1:
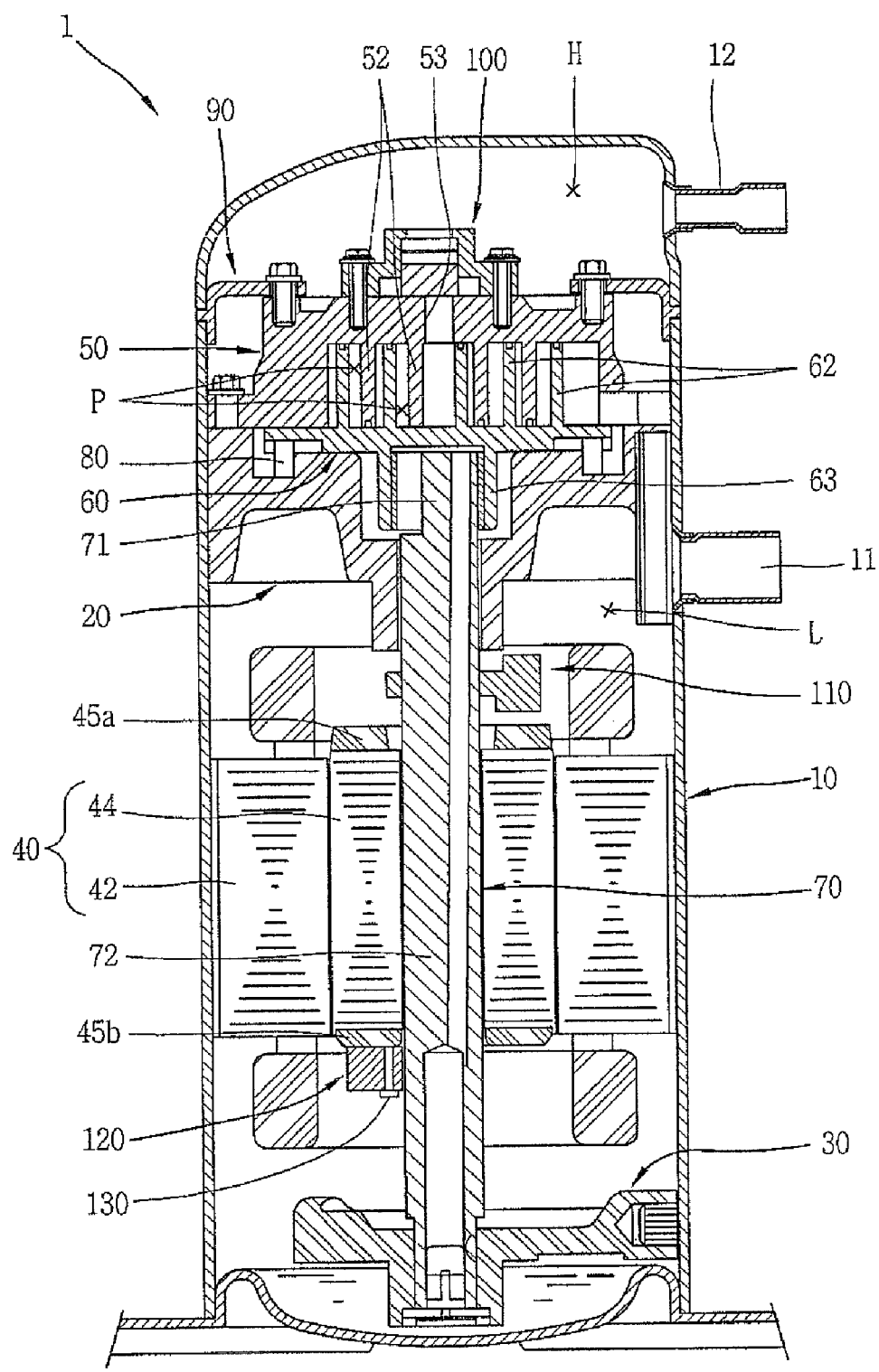
FIG. 1 is a cross-sectional view of a scroll compressor having a device for reducing vibration according to an embodiment.

In general, a compressor is a device that converts mechanical or electrical energy into kinetic energy so as to compress a gas. A compressor may include a driving force generating device, which may include a driving motor to generate a driving force, and a compression device driven by the driving force generating device to compress a gas. Compressors may be categorized into various types, such as a rotary compressor, a scroll compressor, and a reciprocating compressor, according to the method of compression.

In a scroll compressor, a rotation force generated by a driving motor may be transferred to an orbiting scroll through a rotational shaft. The orbiting scroll, which may be interlocked with a fixed scroll, performs an orbiting motion. A plurality of compression pockets or chambers may be formed by a fixed wrap of the fixed scroll and an orbiting wrap of the orbiting scroll. The compression chambers move toward a center of the scroll under the orbiting motion of the orbiting scroll, and the compression chambers change in volume as they move toward the center. Accordingly, a gas may be sucked, compressed, and discharged into a discharge space.

In a scroll compressor, the rotational force generated by the driving motor may be transferred to the compression device via the rotational shaft, thereby generating an imbalance in the rotation during operation. In order to compensate for the imbalance in the rotation, one or more balance devices may be mounted on the rotational shaft or the driving motor. Such balance devices may include a main balance weight mounted on the rotation shaft to be disposed between the orbiting scroll and the driving motor, and a sub-balance weight mounted on a far end of the driving motor.

Since the driving motor and the orbiting scroll are disposed with a certain gap therebetween, the balance devices may be suitable for balancing the force and moment to equilibrium. However, it is difficult to reduce the vibration occurring when an external force having a frequency N times the rotational speed of the rotational shaft is applied in a torsional direction. That is, when the driving motor is operated, a small torque ripple or torsional vibration may be generated by the driving motor. The vibration is generated in the rotor of the driving motor in a circumferential direction. The vibration may reduce the reliability of the compression device and its performance.

Description will now be given in detail of a scroll compressor and a device for reducing vibration therefore according to an embodiment, examples of which are illustrated in the accompanying drawings. The present application shows an embodiment of a scroll compressor and device for reducing vibration therefore; however, the device for reducing vibration according to embodiments may be implemented in other types of compressors, for example, a rotary compressor. Further, the scroll compressor may be a low side scroll or reciprocal compressor or a high side scroll compressor. Further, although in the following description and accompanying drawings, for convenience of description, the compressor is shown and described in a vertical orientation, it will be readily understood by one skilled in the art that the compressor may be arranged in any orientation without difficulty.

Figure 2:
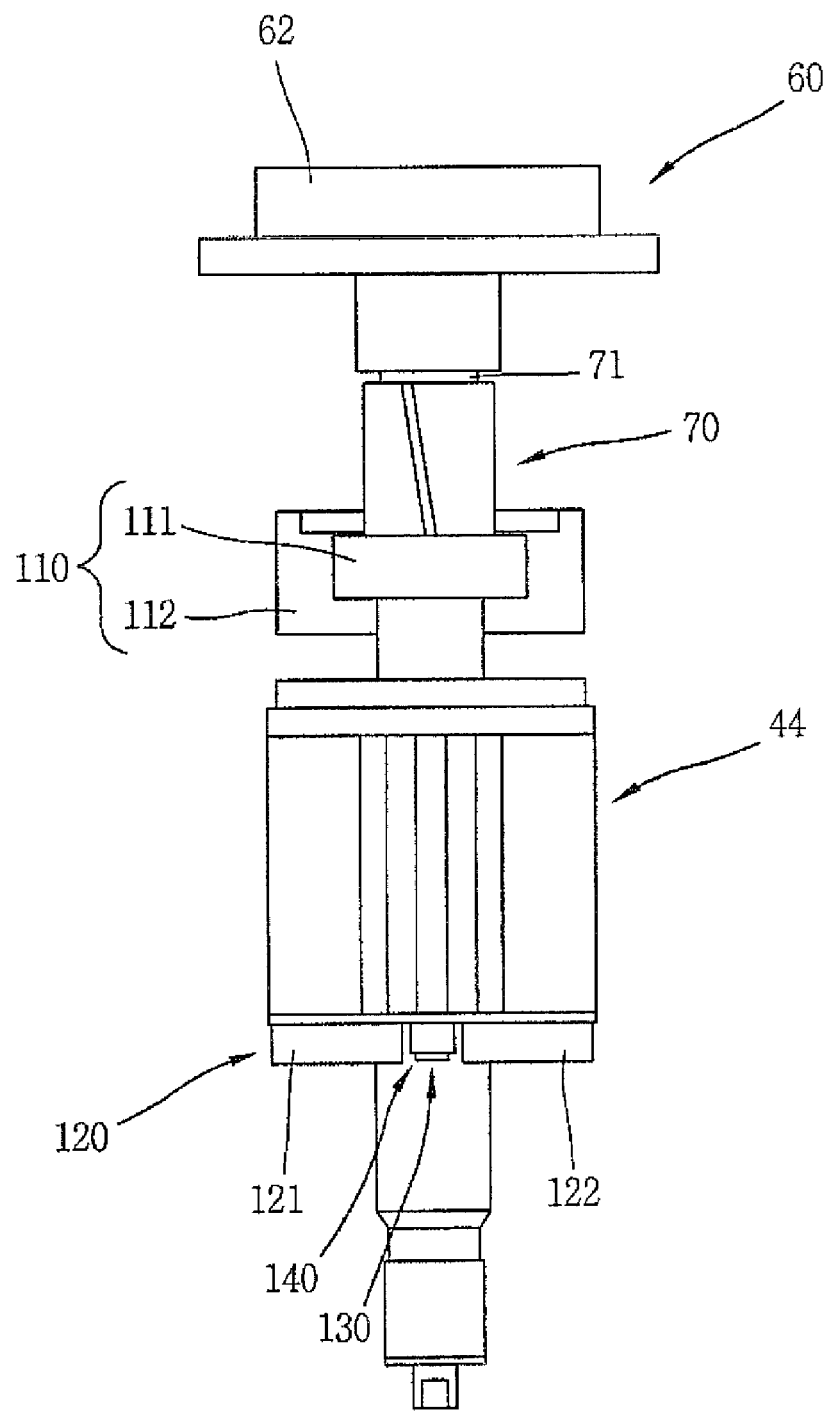
FIGS. 2 and 3 are, respectively, a front view and an exploded perspective view showing the device for reducing vibration of FIG. 1.
Figure 3:
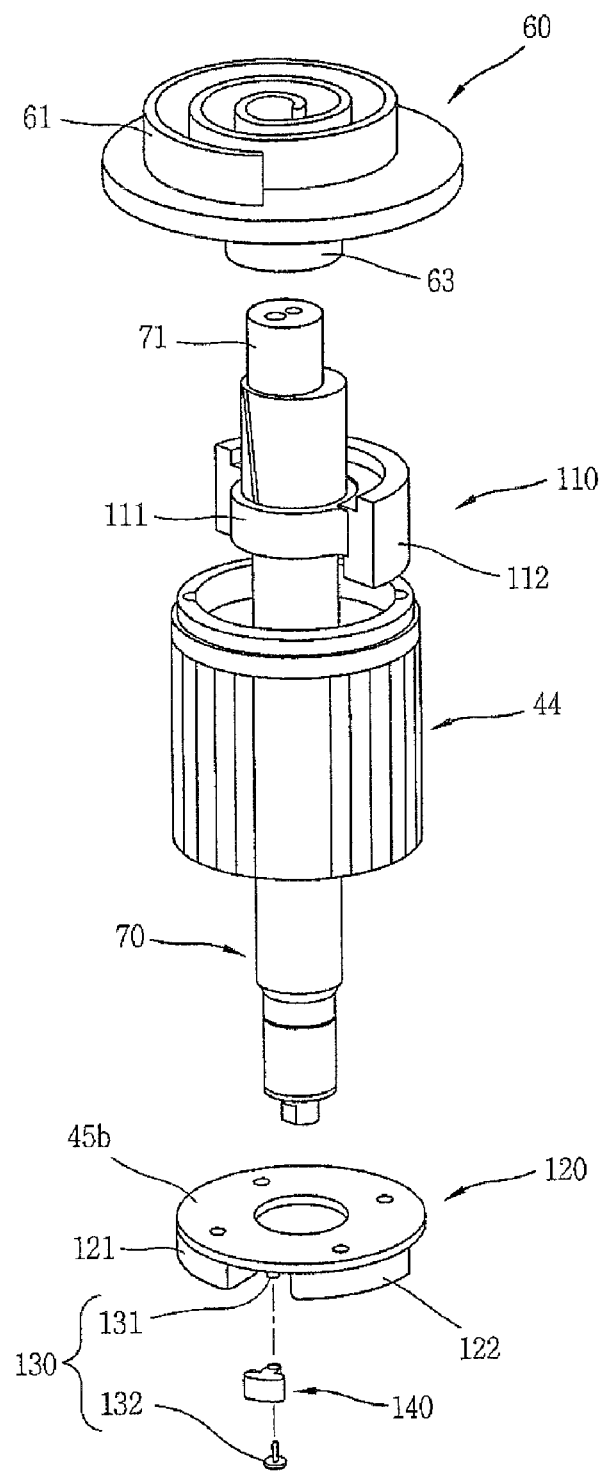

FIG. 1 is a cross-sectional view of a scroll compressor having a device for reducing vibration according to an embodiment. FIGS. 2 and 3 are, respectively, a front view and an exploded perspective showing the device for reducing vibration of FIG. 1.

As shown in FIG. 1, the scroll compressor 1 may include a casing 10, a main frame 20 and a subframe 30 fixed, respectively, to inner upper and lower ends of the casing 10, a driving motor 40 fixedly coupled to an inside of the casing 10 so as to be mounted between the main frame 20 and the subframe 30, a fixed scroll 50 disposed from the main frame 20 with a certain gap therebetween and fixedly coupled to the inside of the casing 10, an orbiting scroll 60 disposed between the fixed scroll 50 and the main frame 20 to perform an orbiting motion while being interlocked with the fixed scroll 50, a rotational shaft 70 that transfers a driving force of the driving motor 40 to the orbiting scroll 60, and an Oldham ring 80 inserted between the orbiting scroll 60 and the main frame 20 that prevents the orbiting scroll 60 from rotating on its axis. The driving motor 40 may include a stator 42 fixed inside of the casing 10, and a rotor 44 rotatable inside of the stator 42.

The rotational shaft 70 may include a shaft portion 72 having a certain length, and an eccentric portion 71 formed at one end of the shaft portion 72 so as to be eccentric with respect to a center of a shaft portion 72. A middle portion of the shaft portion 72 of the rotational shaft 70 may be fixed within the rotor 44 of the driving motor 40. The eccentric portion 71 of the rotational shaft 70 may be engaged in a boss 63 formed at a rear or lower surface of the orbiting scroll 60. A main balance weight 110 may be mounted on the shaft portion 72 of the rotational shaft 70 which is disposed between the orbiting scroll 60 and the rotor 44. A sub-balance weight 120 may be fixed to a lower end of the rotor 44. End-rings 45a and 45b may be mounted on the upper and lower ends of the rotor 44, respectively. The sub-balance weight 120 may be fixed to the end-ring 45*b* disposed at the lower end of the rotor 44.

Further, a vibration absorbing device or unit may be mounted on the rotational shaft 70, the rotor 44, or the sub-balance weight 120. The vibration absorbing device absorbs vibration generated in a rotational direction.

The sub-balance weight 120 may be mounted on the lower end-ring 45*b* of the rotor 44, and the vibration absorbing device may be mounted at an assembly including the lower end-ring 45*b* and the sub-balance weight 120 integrally assembled. Further, the main balance weight 110 may be formed in a ring shape and may include a ring-shaped fixing portion 111 fixedly inserted into the shaft portion 72 of the rotational shaft 70, and a mass portion 112 extending at one side of the ring-shaped fixing portion 111 in a certain shape to have a volume. When the main balance weight 110 is coupled to the shaft portion 72 of the rotational shaft 70, the mass portion 112 of the main balance weight 110 may be positioned at an opposite side to the eccentric portion 71.

Alternatively, the configurations of the main balance weight 110 and the sub-balance weight 120 may be reversed. In such a case, the vibration absorbing device may be incorporated into the assembly including the sub-balance weight 120.

Figure 4:
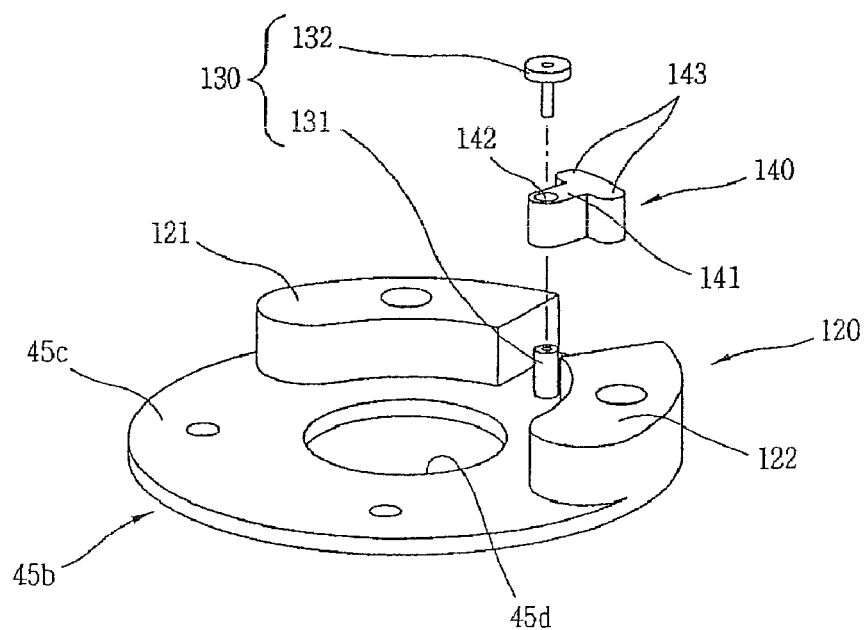
FIG. 4 is an exploded perspective view of the device for reducing vibration of FIG. 1.

As shown in FIG. 4, the assembly integrally formed of the lower end-ring 45*b* and the sub-balance weight 120 may include the lower end-ring 45*b* in the form of a disk 45*c* having a certain thickness and area and provided with a through hole 45*d* so as to pass the rotational shaft 70 through a center thereof, and the sub-balance weight 120 comprising a pair of masses 121, 122 coupled to one side of the disk 45*c* with a gap therebetween. The masses 121, 122 may be formed in a circular arc shape having a certain width and thickness. The masses 121, 122 may be disposed at one side of the disk 45*c*, for example, in an area corresponding to one half of the disk 45*c*. One end surface of each of the masses 121, 122 may face the other. The masses 121, 122 may be fixedly coupled to the disk 45*c* by means of, for example, screws. Meanwhile, the pair of masses 121, 122 may be integrally formed with the disk 45*c*, or may be formed in various other shapes.

The vibration absorbing device may include a pivot shaft 130 disposed between the two masses 121, 122, and an absorber 140 inserted onto the pivot shaft 130 and movable in a circumferential direction of the rotational shaft 70. The pivot shaft 130 may include a fixing pin 131 and a fixing bolt 132. The fixing pin 131 may have a certain external diameter and length, may be fixed to the disk 45*c*, and may have a threaded hole at a center thereof Further, the fixing bolt 132 may be threaded into the threaded hole of the fixing pin 131 to prevent the separation of the absorber 140 therefrom. The fixing pin 131 may be integrally formed with the disk 45*c*. The pivot shaft 130 may be disposed between the two masses 121, 122.

The absorber 140 may include a long shaft portion 141 having a certain width and length, a pin hole 142 formed at an outer end of the long shaft portion 141, and lateral protrusion portions 143 each extending to the sides of the other end of the long shaft portion 141 a certain length. The lateral protrusion portions 143 may be positioned at an opposite end to the pin hole 142, and may be formed to have the same height as the long shaft portion 141 with a certain length. The height of the absorber 140 may be fixed and may correspond to the heights (thicknesses) of the two masses 121, 122. The outer ends of both the lateral protrusion portions 143 may be formed in a curved shape. Also, the outer end of the long shaft portion 141 and the outer surface of each of the two lateral protrusion portions 143 may be formed to have a curved shape. Additionally, the lateral protrusion portions 143 of the absorber 140 may include a collision absorbing layer.

After the pin hole 142 of the absorber 140 is inserted onto the fixing pin 131 coupled to the disk 45*c*, the fixing bolt 132 may be coupled into the threaded hole in the fixing pin 131. The head of the fixing bolt 132 may prevent the separation of the absorber 140 therefrom.

Further, a center of gravity of the absorber 140 may be positioned at the long shaft portion 141. The center of gravity of the absorber 140 may be spaced from the pin hole 142 by a certain distance. The pin hole 142 may be disposed from the center of the disk 45*c* by a certain distance therebetween. Accordingly, a distance between the center of gravity of the absorber 140 and the center of the disk 45*b* may be greater than a distance between the center of the pin hole 142 and the center of the disk 45*b*. However, the distance between the center of gravity of the absorber 140 and the center of the disk 45*b* may be shorter than the distance between the center of the pin hole 142 and the center of the disk 45*c*. That is, the center of gravity of the absorber 140 may be disposed between the center of the disk 45*b* and the pin hole 142.

When the absorber 140 is coupled onto the pivot shaft 130, the disk 45*c* may be fixedly coupled to the lower end surface of the rotor 44 of the driving motor. Thus, the disk 45*c* forms the end-ring 45*b* at the lower end of the rotor 44.

Further, an assembly is formed of the disk 45*c*, the two masses 121, 122, the fixing pin 131, and the absorber 140. The assembly may be formed as a separate assembly and fixed at a certain location of the rotational shaft 70. That is, although the disk 45*c* forms the end-ring 45*b* at the lower end of the rotor 44, the end-ring of the rotor 44 may be separately formed. An assembly having the disk 45*c* may be separately formed, thus, to fix the assembly to a certain location of the rotational shaft 70.

A suction pipe 11 and a discharge pipe 12 may be coupled to the casing 10, respectively, and a lower portion of the casing 10 filled with oil. The scroll compressor may be a high pressure scroll compressor which operates at a high pressure inside the casing, or a low pressure scroll compressor which operates at a low pressure inside the casing. Moreover, in the drawings, reference numeral 42 denotes a stator, 90 denotes a high/low pressure separator, 100 denotes a check valve, H denotes a high pressure space, and L denotes a low pressure space.

Hereinafter, an operation of the vibration absorbing device in a scroll compressor according an embodiment will be described in detail.

In the scroll compressor, when power is applied to the driving motor 40, the driving motor 40 is operated. The rotational force of the driving motor 40 is transferred to the orbiting scroll 60 through the eccentric portion 71 of the rotational shaft 70. Then, the orbiting scroll 60 performs an orbiting motion while interlocked with the fixed scroll 50 due to the rotational force while constrained by the Oldham ring 80 so as not to rotate on its axis.

As the orbiting scroll 60 performs the orbiting motion, a wrap 62 of the orbiting scroll 60 performs an orbiting motion while being interlocked with a wrap 52 of the fixed scroll 50. A plurality of compression pockets P are formed between the wrap 62 of the orbiting scroll 60 and the wrap 52 of the fixed scroll 50. As the compression pockets P move toward the centers of the fixed and orbiting scrolls 50 and 60, the compression pockets P change (for example, decrease) in volume. Accordingly, a gas is sucked, compressed, and discharged through a discharge hole 53 in the fixed scroll 50.

The rotational force from the driving motor 40 is transferred to the orbiting scroll 60 by the rotational shaft 70, and thus the orbiting scroll 60 performs an orbiting motion while being eccentrically coupled to the fixed scroll 50 to compress a gas. During the compression of the gas, the distance difference between the driving motor 40 and the orbiting scroll 60 generates force and moment disequilibrium.

The force and moment disequilibrium is compensated by the main balance weight 110 and the sub-balance weight 120. The rotation mass comprised of the rotational shaft 70, the rotor 44, and the orbiting scroll 60 may have a counteracting force and moment equilibrium, thereby maintaining a dynamically stable state.

Further, when vibration occurs in the rotational direction due to a torque ripple generated by the driving motor 40 generating the rotational force or due to an external force, the absorber 140 of the vibration absorbing device is displaced in the rotational direction of the rotation mass, that is, in a circumferential direction, centering around the pivot shaft 130 and thereby absorbs, or damps the angular vibration generated in the rotational direction.

More specifically, when a torque ripple is generated by the driving motor 40, a small angular vibration is generated by the rotor 44 of the driving motor in the rotational direction. The vibration is transferred to the rotation mass having the rotor 44, and the rotation mass then vibrates in the rotational direction. In this case, as the absorber 140 is displaced in the rotational direction centering around the pivot shaft 130, the vibration of the rotation mass in the rotational direction is canceled and dampened.

Figure 5:
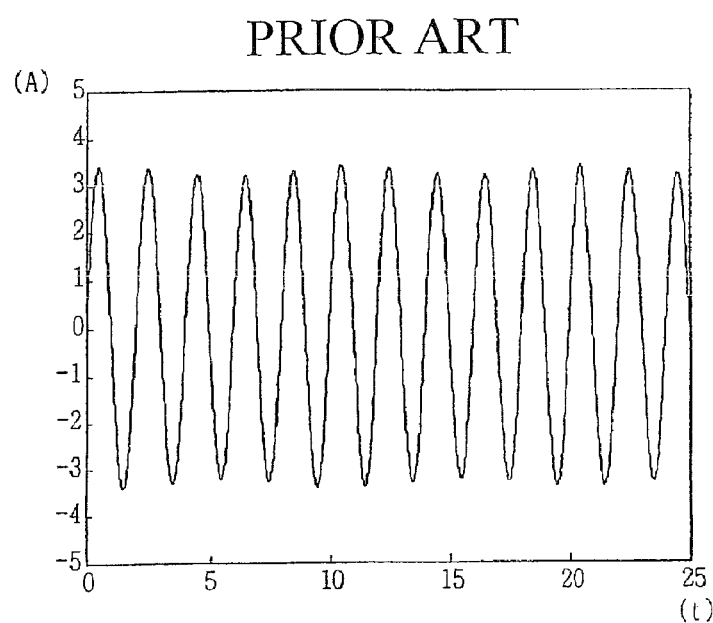
FIG. 5 is a graph showing a state of vibration generated in a related art scroll compressor without a device for reducing vibration according to an embodiment.
Figure 6:
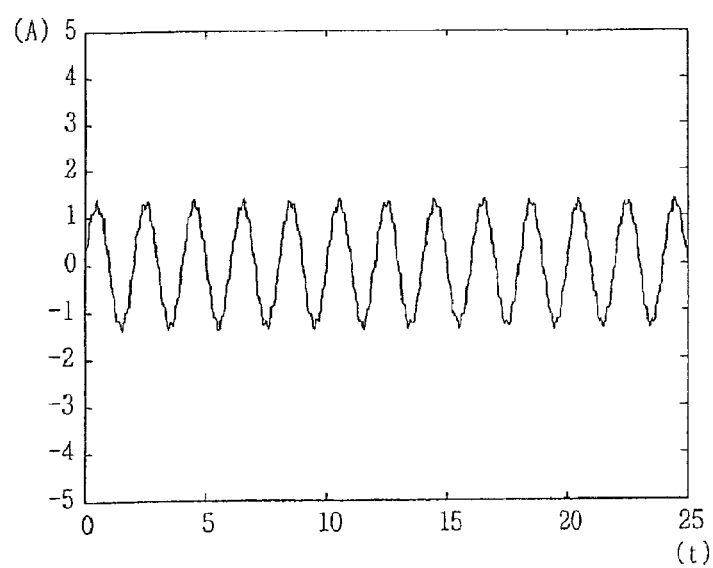
FIG. 6 is a graph showing a state of vibration generated in a scroll compressor implementing a device for reducing vibration according to an embodiment.

FIG. 5 is a graph showing a vibration state occurring in a scroll compressor without a vibration absorbing device. FIG. 6 is a graph showing a vibration state occurring in a scroll compressor with a vibration absorbing device according to embodiments. As shown, the vibration absorbing device according to embodiments may significantly reduce the vibration in the scroll compressor. The vibration absorbing device according to embodiments may also be applied to, for example, a reciprocal compressor or a rotary compressor that compresses a gas by receiving a rotational force of the motor, in addition to a scroll compressor.

As described above, when vibration is generated in a rotational direction by the driving motor generating the rotational force or due to an external force, the device for reducing vibration in a compressor according to embodiments may absorb the vibration in the rotational direction, thereby minimizing the occurrence of the vibration in the compressor. Accordingly, the reliability of the compressor may be enhanced. Further, when a refrigerating cycle device employing the compressor is mounted in an air conditioner, the vibration propagated by a pipeline connecting components of the air conditioner to each other may be minimized, thus, enhancing the reliability of the product.

A device for reducing vibration in a compressor according to embodiments disclosed herein may minimize a vibration occurring when a gas is compressed by receiving a rotation force from a driving motor. In accordance with one embodiment, as embodied and broadly described herein, there is provided a device for reducing vibration in a compressor that includes a rotation shaft for transferring a rotation force of a motor to a compression part, and a vibration absorbing unit for absorbing a vibration occurring in a rotation mass comprised of the rotation shaft and a rotor of the motor.

Although a scroll compressor is presented herein, for ease of discussion, it is well understood that the device for reducing vibration according to embodiments disclosed herein may be equally applied to other types of compressors, or another application in which this type of vibration reducing is required and/or advantageous.

Figure 7:
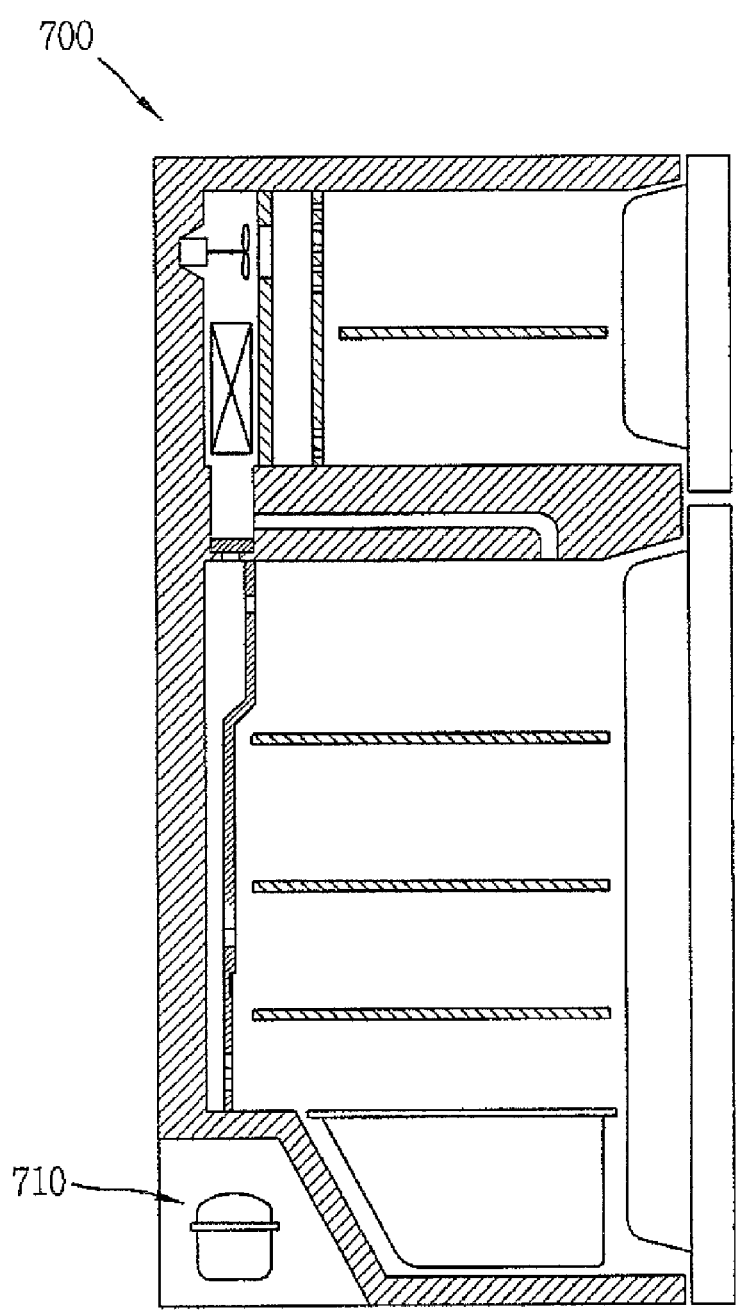
FIGS. 7-9 are exemplary installations of a compressor having a device for reducing vibration according to embodiments.

More specifically, the compressor and device for reducing vibration according to embodiments disclosed herein may have numerous applications in which compression of fluid is required. Such applications may include, for example, air conditioning and refrigeration applications. One such exemplary application is shown in FIG. 7, in which a compressor 710 having a device for reducing vibration according to embodiments disclosed herein is installed in a refrigerator/freezer 700. Installation and functionality of a compressor in a refrigerator is discussed in detail in U.S. Pat. Nos. 7,082,776, 6,955,064, 7,114,345, 7,055,338, and 6,772,601, the entirety of which are incorporated herein by reference.

Figure 8:
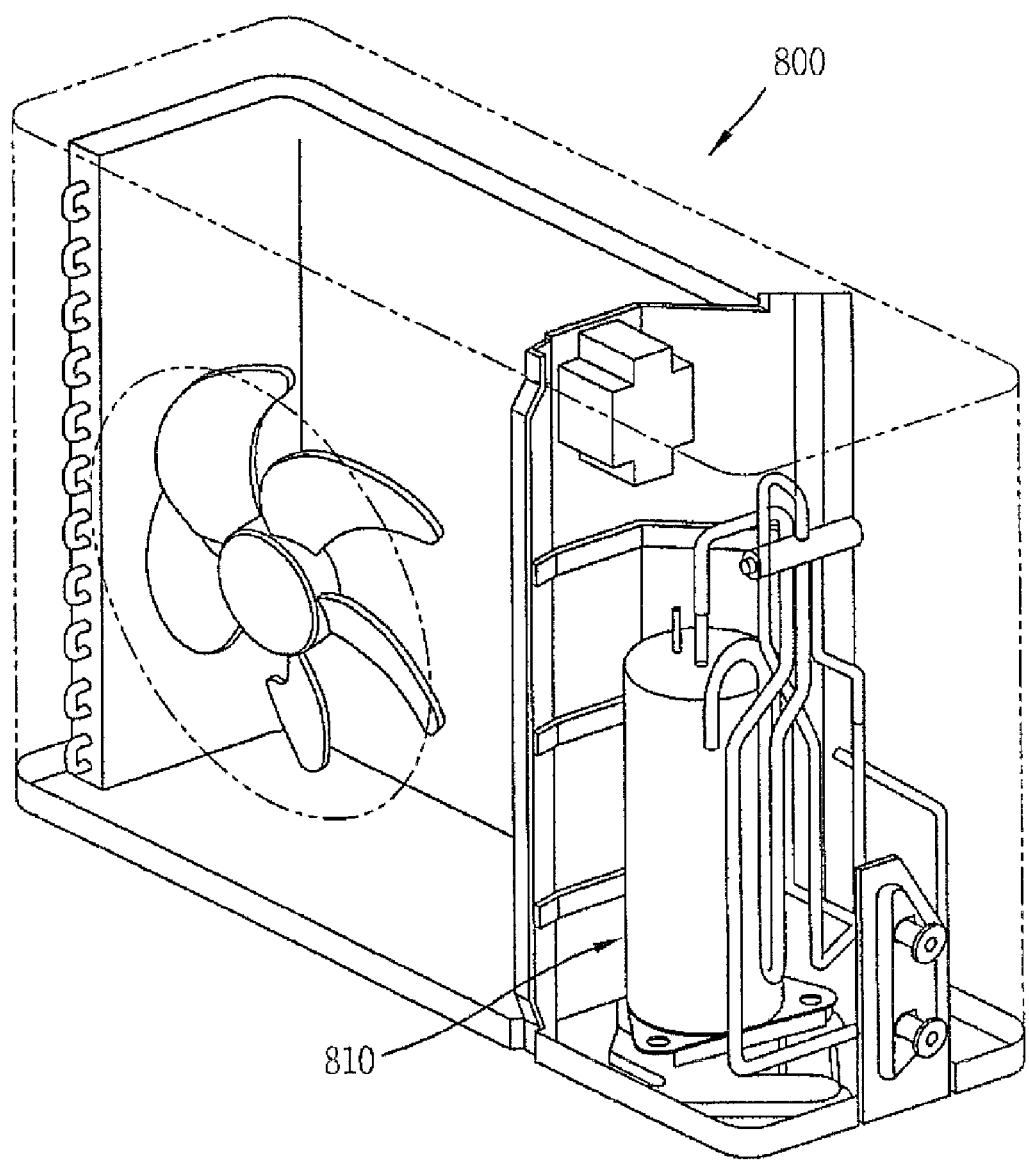

Another such exemplary application is shown in FIG. 8, in which a compressor 810 having a device for reducing vibration according to embodiments disclosed herein is installed in an outdoor unit air conditioner 800. Installation and functionality of a compressor in a refrigerator is discussed in detail in U.S. Pat. Nos. 7,121,106, 6,868,681, 5,775,120, 6,374,492, 6,962,058, 6,951,628, and 5,947,373, the entirety of which are incorporated herein by reference.

Figure 9:
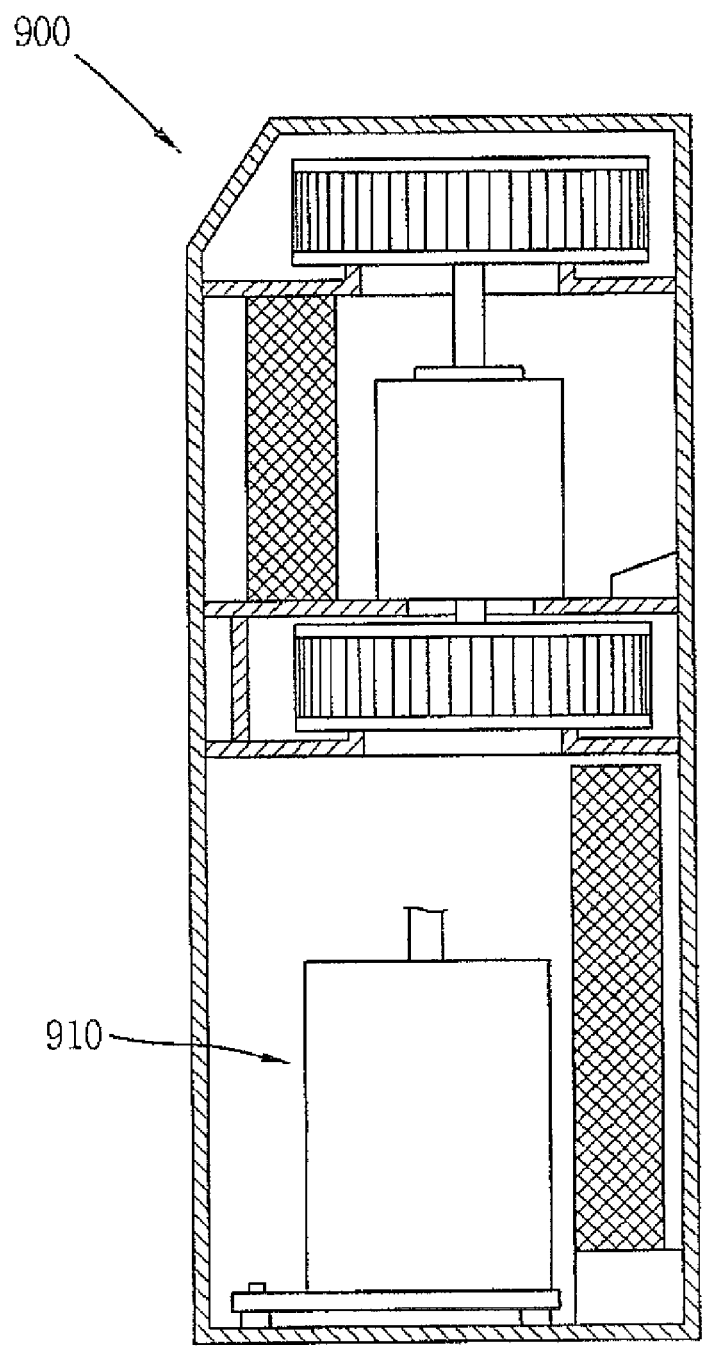

Another such exemplary application is shown in FIG. 9, in which a compressor 910 having a device for reducing vibration according to embodiments disclosed herein is installed in a single, integrated air conditioning unit 900. Installation and functionality of a compressor in a refrigerator is discussed in detail in U.S. Pat. Nos. 7,032,404, 6,412,298, 7,036,331, 6,588,228, 6,182,460, and 5,775,123, the entirety of which are incorporated herein by reference A device for reducing vibration in a compressor according to embodiments disclosed herein may minimize a vibration occurring when a gas is compressed by receiving a rotation force from a driving motor.

In accordance with one embodiment, as embodied and broadly described herein, there is provided a device for reducing vibration in a compressor that includes a rotation shaft for transferring a rotation force of a motor to a compression part, and a vibration absorbing unit for absorbing a vibration occurring in a rotation mass comprised of the rotation shaft and a rotor of the motor.

The above references ate incorporated by reference herein where appropriate for appropriate teachings of additional or alternative details, features and/or technical background.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A compressor, comprising:
   a compression device having a compression chamber and configured to receive, compress, and output a refrigerant;
   a drive motor including a rotor and a stator, configured to rotate the compression device to compress a refrigerant within the compression chamber;
   a rotational shaft attached to the compression device and the rotor of the drive motor;
   a respective balancing weight attached at both sides of the motor; and
   a torsional vibration absorbing device attached to the motor that absorbs torsional vibration, wherein the balancing weight located on one side of the motor includes first and second masses with a gap in a rotational direction therebetween, and wherein the torsional vibration absorbing device comprises:
      a pivot shaft mounted between the first and second masses; and
      a vibration absorbing member pivotally mounted on the pivot shaft, wherein a rotation angle of the vibration absorbing member is restricted by the first and second masses.

2. The compressor of claim 1, wherein the compression device comprises:
   a fixed scroll; and
   an orbiting scroll disposed adjacent to the fixed scroll so as to form the compression chamber therebetween.

3. The compressor of claim 2, wherein the respective balancing weight on both sides of the motor comprises:
   a first balancing weight attached to the rotational shaft between the orbiting scroll and the rotor; and
   a second balancing weight attached to the rotational shaft on a side of the rotor opposite the first balancing weight.

4. The compressor of claim 3, wherein the second balancing weight comprises the first and second masses which are mounted on an end ring.

5. The compressor of claim 4, wherein the vibration absorbing member comprises a shaft portion having a pivot hole at one end and two lateral protrusions at the other end.

6. The compressor of claim 5, wherein outer ends of each of the two lateral protrusions are rounded.

7. The compressor of claim 5, wherein a center of gravity of the vibration absorbing member is positioned on the shaft portion.

8. The compressor of claim 5, wherein a center of gravity of the vibration absorbing member is spaced from the pivot hole.

9. The compressor of claim 5, wherein a distance between a center of gravity of the vibration absorbing member and a center of the end ring is greater than a distance between a center of the pivot hole and the center of the end ring.

10. The compressor of claim 1, wherein the vibration absorbing member comprises a "T"-shaped member having a pivot hole at a base of the "T".

11. The compressor of claim 1, wherein a collision absorbing layer is formed on an outer surface of the vibration absorbing member.

12. The compressor of claim 1, wherein a height of the vibration absorbing member corresponds to a height of the first and second masses.

13. A scroll compressor comprising the compressor of claim 1.

14. A compressor, comprising:
   a compression device having a compression chamber and configured to receive, compress, and output a refrigerant;
   a drive motor configured to rotate the compression device to compress the refrigerant within the compression chamber;
   a first balancing weight attached to a rotational shaft between the compression device and the motor;
   a second balancing weight attached to the rotational shaft on a side of the motor opposite the first balance weight; and
   a torsional vibration absorbing device attached to the rotational shaft that absorbs torsional vibration, wherein the second balancing eight comprises first and second masses, and wherein the torsional vibration absorbing device comprises:
      a pivot shaft mounted between the first and second masses; and
      a vibration absorbing member pivotally mounted on the pivot shaft, wherein a collision absorbing layer is formed on an outer surface of the vibration absorbing member.

15. The compressor of claim 14, wherein the compression device comprises:
   a fixed scroll; and
   an orbiting scroll disposed adjacent to the fixed scroll so as to form the compression chamber therebetween.

16. The compressor of claim 14, wherein the first and second masses are mounted on an end ring.

17. The compressor of claim 16, wherein the vibration absorbing member comprises a shaft portion having a pivot hole at one end and two lateral protrusions at the other end.

18. The compressor of claim 17, wherein outer ends of each of the two lateral protrusions are rounded.

19. The compressor of claim 17, wherein a center of gravity of the vibration absorbing member is positioned on the shaft portion.

20. The compressor of claim 17, wherein a center of gravity of the vibration absorbing member is spaced from the pivot hole.

21. The compressor of claim 17, wherein a distance between a center of gravity of the vibration absorbing member and a center of the end ring is greater than a distance between a center of the pivot hole and the center of the end ring.

22. The compressor of claim 14, wherein the vibration absorbing member comprises a "T"-shaped member having a pivot hole at a base of the "T".

23. The scroll compressor of claim 14, wherein a height of the vibration absorbing member corresponds to a height of the first and second masses.

24. A scroll compressor comprising the compressor of claim 14.

* * * * *